United States Patent
Moriyama

(10) Patent No.: US 8,432,452 B2
(45) Date of Patent: Apr. 30, 2013

(54) IMAGING SYSTEM AND INFORMATION PROCESSING APPARATUS FOR PRESENTING FUNCTIONAL INFORMATION RELATING TO A SHOOTING MODE TO AN IMAGING APPARATUS

(75) Inventor: Ayumi Moriyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 319 days.

(21) Appl. No.: 12/839,111

(22) Filed: Jul. 19, 2010

(65) Prior Publication Data
US 2011/0019009 A1  Jan. 27, 2011

(30) Foreign Application Priority Data
Jul. 24, 2009  (JP) ................. 2009-173607

(51) Int. Cl.
*H04N 5/225* (2006.01)
(52) U.S. Cl.
USPC ..................................... 348/207.1
(58) Field of Classification Search ............. 348/207.1
See application file for complete search history.

(56) References Cited

U.S. PATENT DOCUMENTS 6,006,039 A * 12/1999 Steinberg et al. ........... 396/57
7,505,065 B2 * 3/2009 Oura et al. ................. 348/207.1
7,602,419 B2 * 10/2009 Kiuchi ......................... 348/211.1
2001/0030695 A1 * 10/2001 Prabhu et al. ................ 348/232
2004/0056972 A1 * 3/2004 Jang et al. ................. 348/333.01
2004/0218065 A1 * 11/2004 Schinner ..................... 348/231.6
2008/0266407 A1 * 10/2008 Battles et al. .............. 348/211.2
2011/0096197 A1 * 4/2011 Kusaka et al. ............. 348/231.5

FOREIGN PATENT DOCUMENTS
JP 2004-336326 A 11/2004

* cited by examiner

*Primary Examiner* — Roberto Velez
*Assistant Examiner* — Gary C Vieaux
(74) *Attorney, Agent, or Firm* — Canon USA Inc. IP Division

(57) ABSTRACT

The present invention is directed to providing a shooting mode according to a user's need of an imaging apparatus, whereby a user can easily select the shooting mode. Firstly, an information processing apparatus provides a list, which includes a shooting mode corresponding to attribute information received from the imaging apparatus, to the imaging apparatus. Next, setting information including a shooting parameter of the shooting mode designated by the imaging apparatus from the list is transmitted to the imaging apparatus. The imaging apparatus selects one of the shooting modes corresponding to the setting information transmitted from the information processing apparatus, and executes image processing by using the setting information.

6 Claims, 12 Drawing Sheets

| MODE | UNDERWATER CAMERA | CAMERA FOR FEMALES | HIGH-PERFORMANCE CAMERA | OTHER STANDARD CAMERA |
|---|---|---|---|---|
| UNDERWATER 1 | 5 | 0 | 1 | 0 |
| UNDERWATER 2 | 5 | 0 | 1 | 0 |
| UNDERWATER 3 | 5 | 0 | 0 | 0 |
| BEAUTIFUL SKIN 1 | 2 | 5 | 3 | 3 |
| BEAUTIFUL SKIN 2 | 2 | 5 | 3 | 3 |
| BEACH | 5 | 2 | 3 | 3 |
| SNOW | 5 | 2 | 3 | 3 |
| BACKLIGHT | 4 | 4 | 3 | 3 |
| PORTRAIT | 4 | 5 | 5 | 4 |
| NIGHT VIEW | 3 | 5 | 5 | 4 |
| INDOOR | 3 | 4 | 4 | 4 |
| SPORTS | 2 | 1 | 5 | 2 |
| SKY ROCKET | 3 | 4 | 4 | 3 |

| SHOOTING MODE | NOTES IN RECOMMENDED POINT 1 |
|---|---|
| UNDERWATER 1 | YOU SHOULD USE WATERPROOF CASE WHEN USING IN WATER. |
| UNDERWATER 2 | YOU SHOULD USE WATERPROOF CASE WHEN USING IN WATER. |
| SPORTS | THIS CAMERA IS NOT SUITABLE FOR HIGH-SPEED CONTINUOUS SHOOTING. |

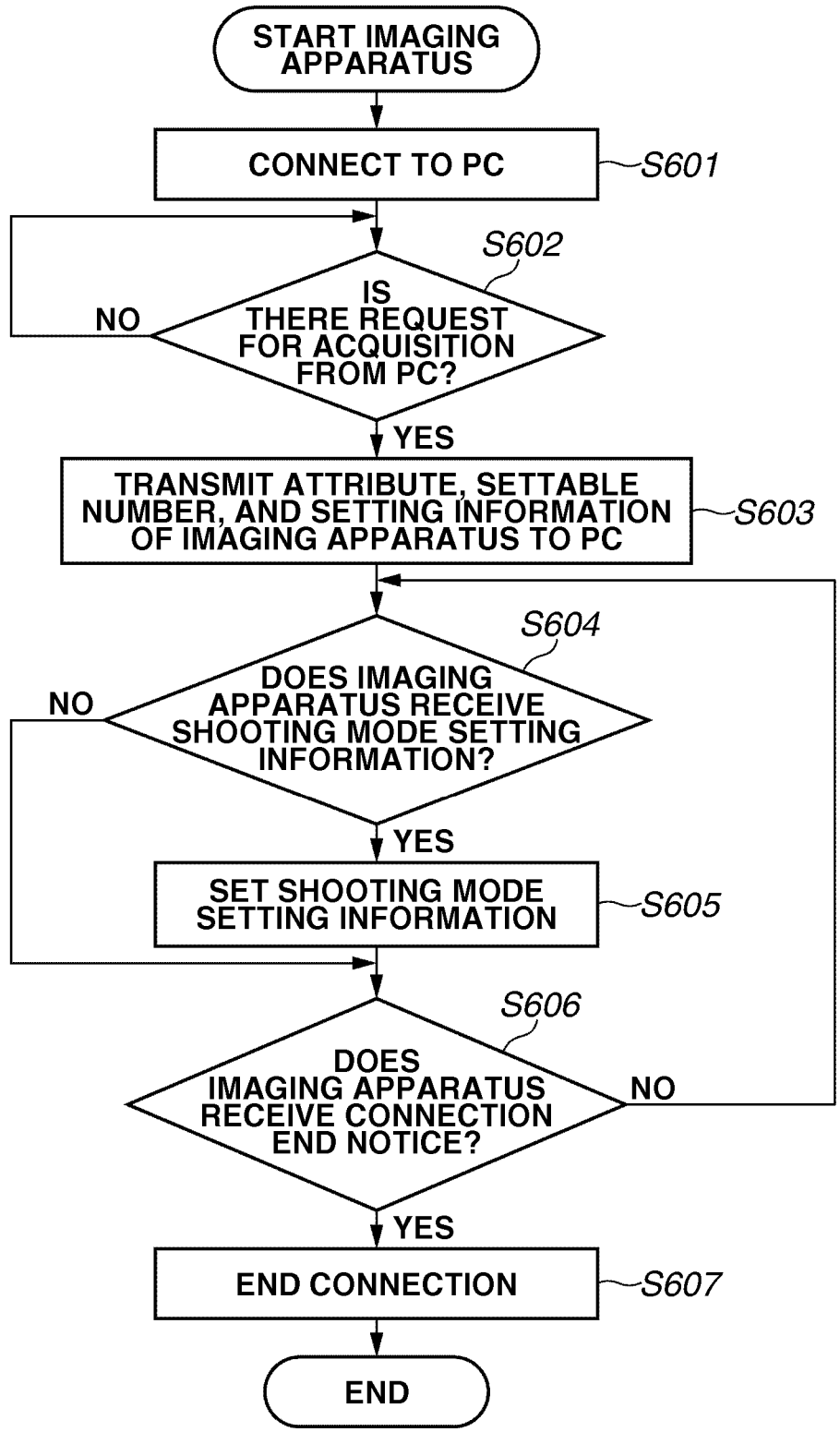

SHOOTING MODE SETTING

SHOOTING MODES RELATING TO SHOOTING MODES SELECTED ON CAMERA ARE DISPLAYED.
YOU CAN SET SHOOTING MODES UP TO 8.

SELECTED SHOOTING MODE: PORTRAIT ~801
RELATED SHOOTING MODE                                                    ~802

| SELECTION | MODE | DESCRIPTION |
|---|---|---|
| ✓ | BEAUTIFUL SKIN 1 | MODE SUITABLE FOR WELL SHOOTING SKIN WITH A LITTLE BRIGHTNESS |
|   | BEAUTIFUL SKIN 2 | MODE SUITABLE FOR WELL SHOOTING SKIN WITH BRIGHTNESS |

SHOOTING MODES THAT HAVE ALREADY BEEN SET TO CAMERA                      ~803

| SELECTION | MODE | DESCRIPTION |
|---|---|---|
| ✓ | UNDERWATER 1 | MODE SUITABLE FOR SHOOTING AT A DEPTH OF 0 TO 1 M |
| ✓ | UNDERWATER 2 | MODE SUITABLE FOR SHOOTING AT A DEPTH OF 1 TO 5 M |
| ✓ | BEACH | MODE SUITABLE FOR SHOOTING PERSON EVEN ON SEA SURFACE OR SAND BEACH WHERE SUNLIGHT IS STRONGLY REFLECTED |
| ✓ | BACKLIGHT | MODE SUITABLE FOR SHOOTING AGAINST THE SUN |
| ✓ | PORTRAIT | MODE SUITABLE FOR SHOOTING PERSON WITH BACKGROUND BLURRED |
| ✓ | SNOW | MODE SUITABLE FOR SHOOTING PERSON WITH SNOWY LANDSCAPE IN THE BACKGROUND |
| ✓ | BEAUTIFUL SKIN 1 | MODE SUITABLE FOR WELL SHOOTING SKIN WITH A LITTLE BRIGHTNESS |
| ✓ | SKY ROCKET | MODE SUITABLE FOR CLEARLY SHOOTING SKY ROCKET WITH OPTIMUM EXPOSURE |

[ SET SELECTED SHOOTING MODE TO CAMERA ]    ( END )
                302                            303

FIG.8

| MODE | RELATED MODE |
|---|---|
| UNDERWATER 1 | UNDERWATER 2, UNDERWATER 3, BEACH |
| UNDERWATER 2 | UNDERWATER 1, UNDERWATER 3, BEACH |
| UNDERWATER 3 | UNDERWATER 1, UNDERWATER 2, BEACH |
| BEACH | UNDERWATER 1, UNDERWATER 2, UNDERWATER 3 |
| SNOW | |
| BACKLIGHT | |
| PORTRAIT | BEAUTIFUL SKIN 1, BEAUTIFUL SKIN 2 |
| NIGHT VIEW | SKY ROCKET |
| INDOOR | |
| SKY ROCKET | NIGHT VIEW |
| BEAUTIFUL SKIN 1 | PORTRAIT, BEAUTIFUL SKIN 2 |
| BEAUTIFUL SKIN 2 | PORTRAIT, BEAUTIFUL SKIN 1 |
| SPORTS | |

~900

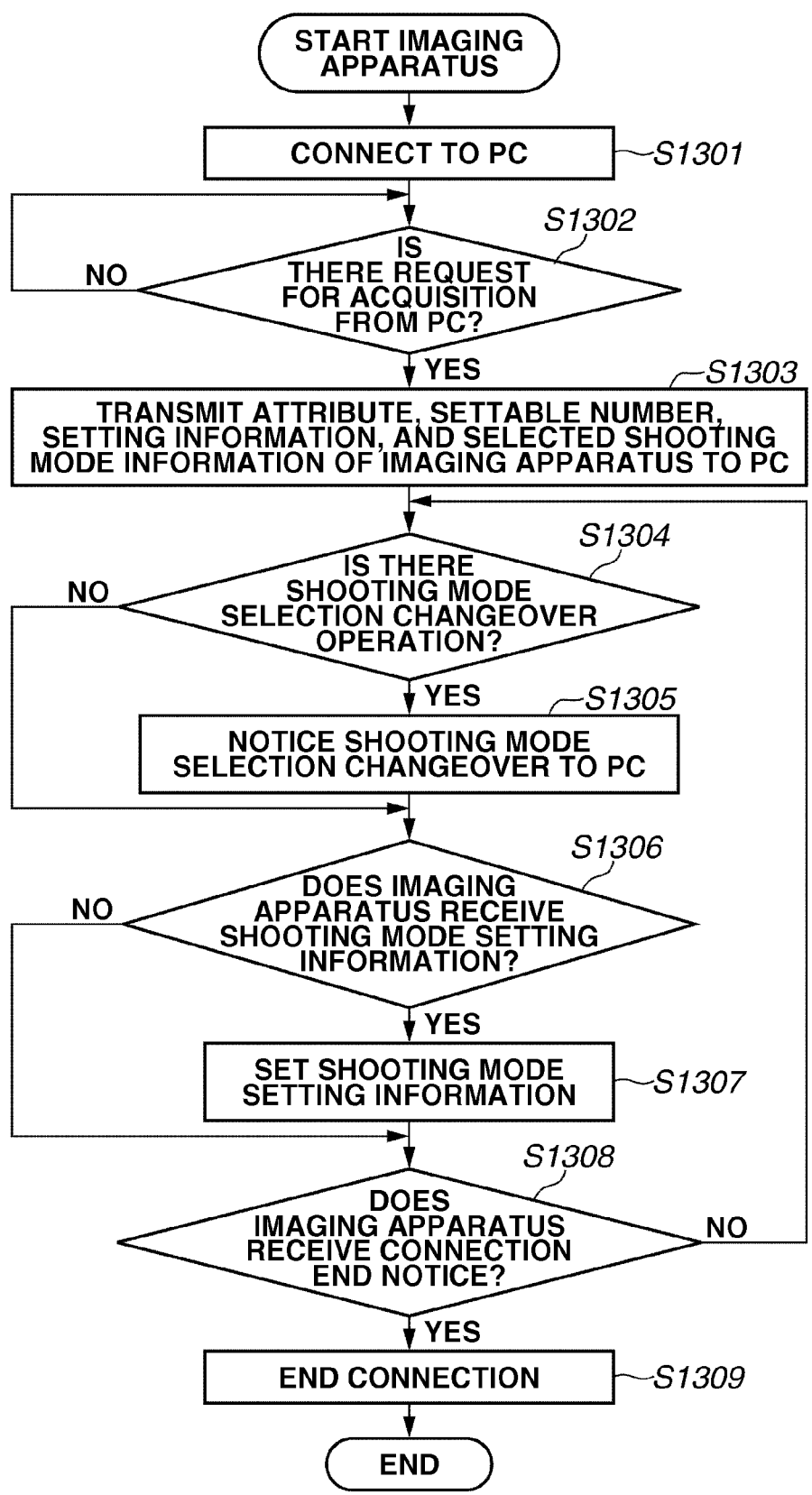

IMAGING SYSTEM AND INFORMATION PROCESSING APPARATUS FOR PRESENTING FUNCTIONAL INFORMATION RELATING TO A SHOOTING MODE TO AN IMAGING APPARATUS

BACKGROUND OF THE INVENTION

1. Field of the Invention

The present invention relates to an imaging system, an information processing apparatus in which the information processing apparatus presents functional information relating to a shooting mode to an imaging apparatus, and the imaging apparatus executes image processing using the shooting mode, and relates to the control method thereof, and a computer-readable storage medium storing a program.

2. Description of the Related Art

An imaging apparatus is generally provided with various shooting modes, with which a shooting parameter setting such as an image quality adjustment is associated so that a beginner user can easily shoot an image suitable for a scene. A user can shoot an optimum image by selecting only the shooting mode without setting various shooting parameters.

In recent years, these shooting modes are diversified and increased with the increased functions of the camera. Therefore, the user has to select one from many modes when the user selects the shooting mode, and the user takes much time for the selection. As a result, the user might miss a photo opportunity.

SUMMARY OF THE INVENTION

The present invention is directed to an imaging system, an information processing apparatus, and its control method for providing a shooting mode according to a need of a user of an imaging apparatus so that the user can easily select the shooting mode.

According to an aspect of the present invention, an imaging system in which an imaging apparatus and an information processing apparatus can communicate with each other is provided, wherein the information processing apparatus includes a receiving unit configured to receive attribute information related to the imaging apparatus from the imaging apparatus, a providing unit configured to provide a list including plural shooting modes, each corresponding to the attribute information, to the imaging apparatus, and a transmitting unit configured to transmit, from the list, setting information including a shooting parameter of a shooting mode that is designated by the imaging apparatus, to the imaging apparatus, and wherein the imaging apparatus includes a selection unit configured to select one of the shooting modes corresponding to the setting information transmitted from the information processing apparatus, and an imaging unit configured to execute image processing by using the setting information of the selected shooting mode.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 3A and 3B illustrate an example of a table of a recommended point of a shooting mode and a table of a note.

FIG. 5 is a flowchart illustrating an example of an operation of the imaging apparatus.

FIGS. 7A and 7B respectively illustrate an example of the display screen of the PC.

FIG. 8 illustrates an example of a related table of a shooting mode.

FIG. 10 is a flowchart illustrating an example of an operation of the imaging apparatus.

DESCRIPTION OF THE EMBODIMENTS

Various exemplary embodiments, features, and aspects of the invention will be described in detail below with reference to the drawings.

Figure 1A:
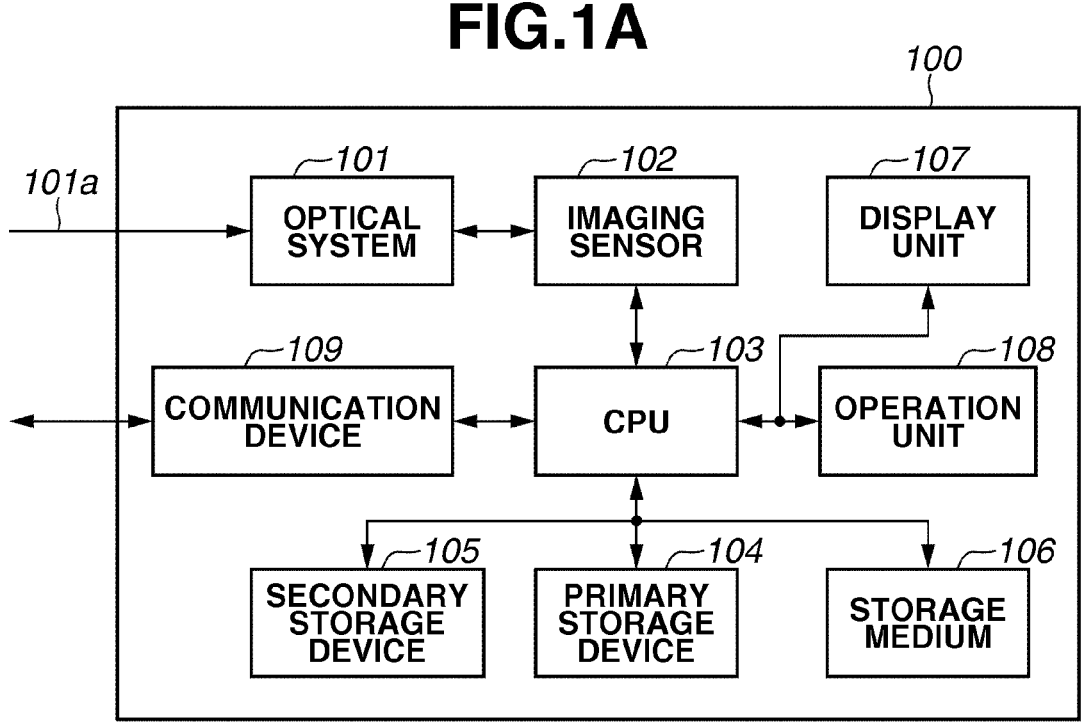
FIGS. 1A and 1B are block diagrams each illustrating an example of a configuration of an imaging apparatus and an example of a configuration of a personal computer (PC).
Figure 1B:
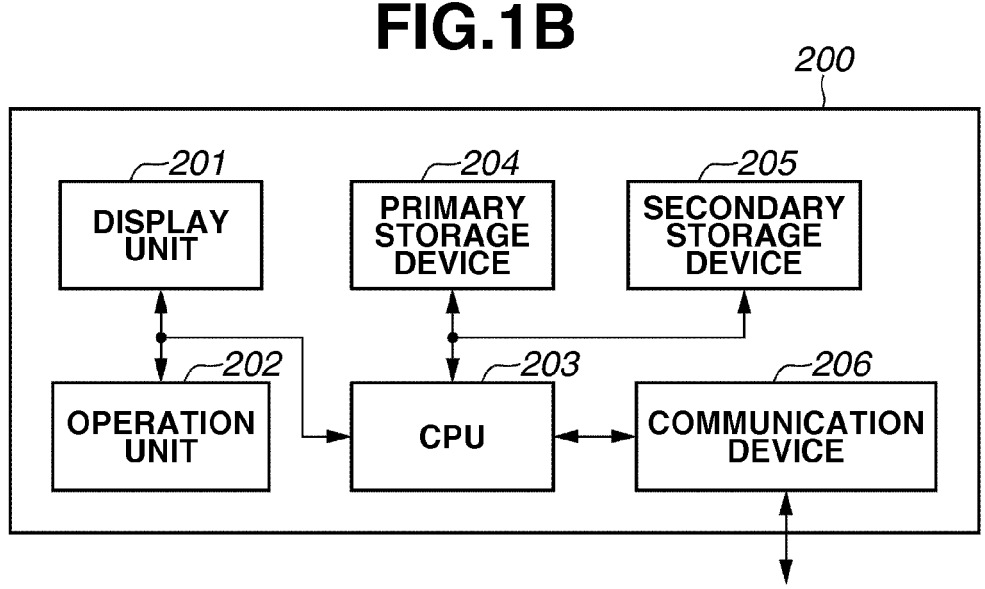

FIGS. 1A and 1B illustrate an example of a configuration of a shooting mode setting system according to the present exemplary embodiment. FIG. 1A is a block diagram illustrating an example of a configuration of an imaging apparatus 100 that is one example of an image processing apparatus according to the present exemplary embodiment. The imaging apparatus 100 in the present exemplary embodiment includes an apparatus that images a subject to produce image data, such as a digital camera, and a digital video camera. The imaging apparatus 100 and the PC 200 constitute the shooting mode setting system.

The imaging apparatus 100 includes an optical system 101, an imaging sensor 102, a central processing unit (CPU) 103, a primary storage device 104, a secondary storage device 105, a storage medium 106, a display unit 107, an operation unit 108, and a communication device 109.

The optical system 101 includes a lens, a shutter, and a diaphragm. The optical system 101 focuses a light 101a from a subject to form an image on the imaging sensor 102 with an appropriate amount of the light and appropriate timing. The imaging sensor 102 converts the formed image through the optical system 101 into an image signal.

The CPU 103 performs various operations, and controls respective units that constitute the imaging apparatus 100 according to an input signal and a program. The primary storage device 104 stores temporal data, and is used as a work area of the CPU 103. The secondary storage device 105 stores a program (firm ware) and various pieces of setting information for controlling the imaging apparatus 100.

The storage medium 106 stores captured image data. The storage medium 106 can be removed after the image capturing, and it can be inserted into a personal computer (hereinafter referred to as PC) to read data therefrom. Specifically, the imaging apparatus 100 may have an access unit to the storage medium 106 for performing read/write of data to the storage medium 106.

The display unit 107 displays a view finder image, displays a captured image, and displays characters for a dialogical operation. The imaging apparatus 100 does not necessarily need to have the display unit 107. The imaging apparatus 100 may have a display control function for controlling the display on the display unit 107.

The operation unit 108 accepts an operation by a user. The operation unit 108 can employ a button, a lever, a touch panel, and the like, for example. The communication device 109 is connected to an external device to transmit and receive a control command and data. For example, a Picture Transfer Protocol (PTP) is used as a protocol for establishing the connection to achieve data communication.

The communication device 109 may perform communication with a wired connection with the use of a Universal serial Bus (USB) cable, for example. It may also perform communication with a wireless connection with the use of a wireless local area network (LAN). It may also be directly connected to the external device, or may be connected to the external device via a server or a network such as the Internet.

A PC is used, for example, as an information processing apparatus to which the present exemplary embodiment is applied. FIG. 1B is a block diagram illustrating an example of a configuration of a PC 200 as one example of the information processing apparatus. As illustrated in FIG. 1B, the PC 200 includes a display unit 201, an operation unit 202, a CPU 203, a primary storage device 204, a secondary storage device 205, and a communication device 206. Since the basic function of each of the units is the same as those in the imaging apparatus 100, the detailed description will not be repeated here.

A display device such as a liquid crystal display (LCD) is used for the display unit 201. The PC 200 does not necessarily need to have the display unit 201. The PC 200 may have a display control function for controlling the display on the display unit 201. A keyboard or a mouse can be used as the operation unit 202. In the present exemplary embodiment, the imaging apparatus 100 and the PC 200 are connected to each other via the communication devices 109 and 206.

The present exemplary embodiment will be described with reference to FIGS. 2 to 5. The present exemplary embodiment is a system in which a recommended shooting mode is provided according to the imaging apparatus 100 connected to the PC 200, and sets the shooting mode selected by a user to the imaging apparatus 100.

Figure 2A:
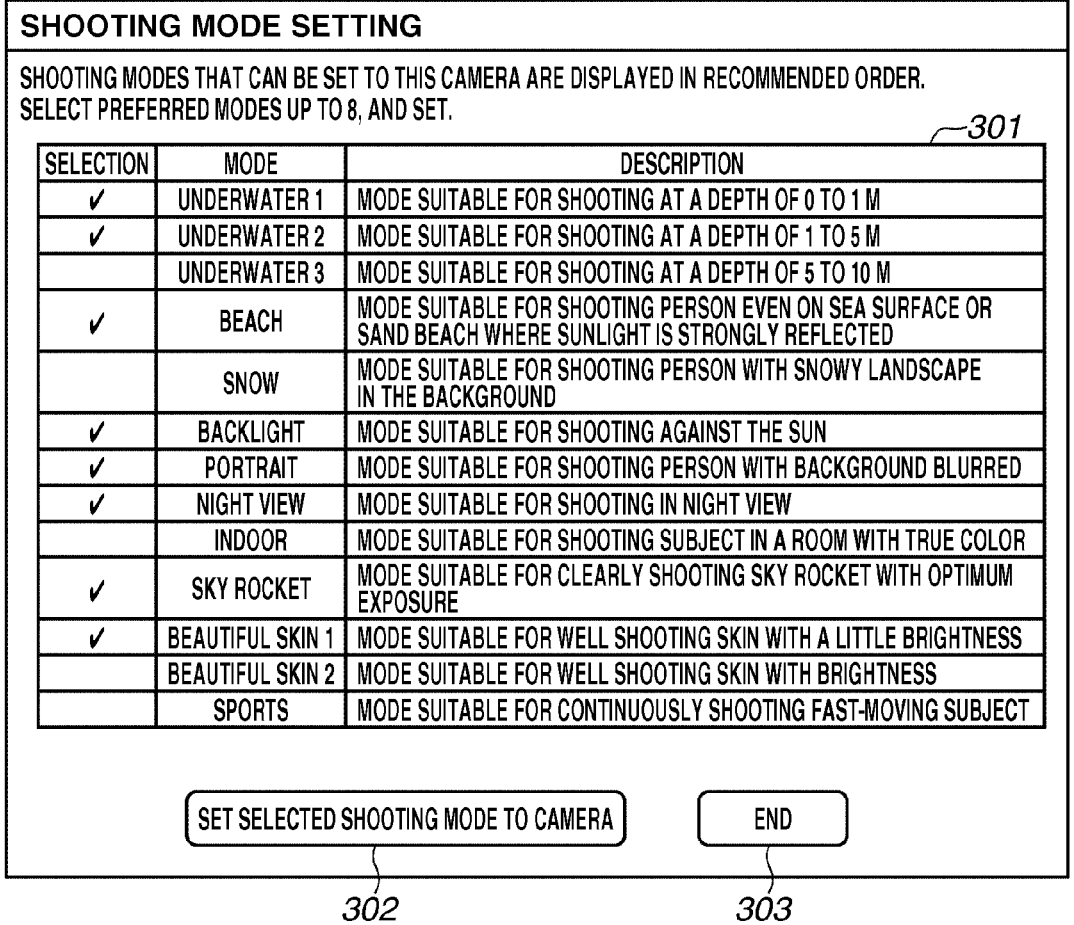
FIGS. 2A and 2B respectively illustrate an example of a display screen of the PC.

FIG. 2A illustrates an example of a screen displayed on the PC 200. When the imaging apparatus 100 and the PC 200 are connected to each other, the PC 200 displays a shooting mode setting screen 300 on the display unit 201.

Recommended shooting modes and their description are displayed in descending order on a list 301 displayed on the shooting mode setting screen 300. A user can select the shooting mode, which the user intends to set, with a check box.

A setting button 302 is a button for setting the shooting mode, which is in the selected state with the check box on the list 301, to the imaging apparatus 100. The set content includes a combination of various parameters, such as a flash control, shutter speed, an aperture value, International Organization for Standardization ISO sensitivity, and white balance, and further, the name and icon of the shooting mode that is displayed on the display unit 107 of the imaging apparatus 100.

If the number of the selected shooting modes exceeds the upper limit of the number of the shooting modes that can be set to the imaging apparatus 100 when the setting button 302 is pressed, an error message is displayed. Alternatively, it may be controlled in such a manner that the check box is grayed out so that the user cannot select the shooting modes in the number exceeding the upper limit. A button 303 is an end button. When it is pressed, the communication processing between the imaging apparatus 100 and the PC 200 is ended, and the present screen for the presentation of the shooting modes is ended.

The order of the shooting modes in the list on the shooting mode setting screen is changed according to the camera connected to the PC 200. In the example in FIG. 2A, it is supposed that the imaging apparatus 100 connected to the PC 200 is an imaging apparatus having a waterproof function, i.e., the imaging apparatus can take a photograph even in water.

The secondary storage device 105 of the imaging apparatus 100 stores attribute information (function information) indicating a characteristic of the imaging apparatus 100. Based on the attribute information, a mode related to underwater shooting is displayed above in preference on the setting screen in FIG. 2A, whereby a user can easily select this mode.

Figure 2B:
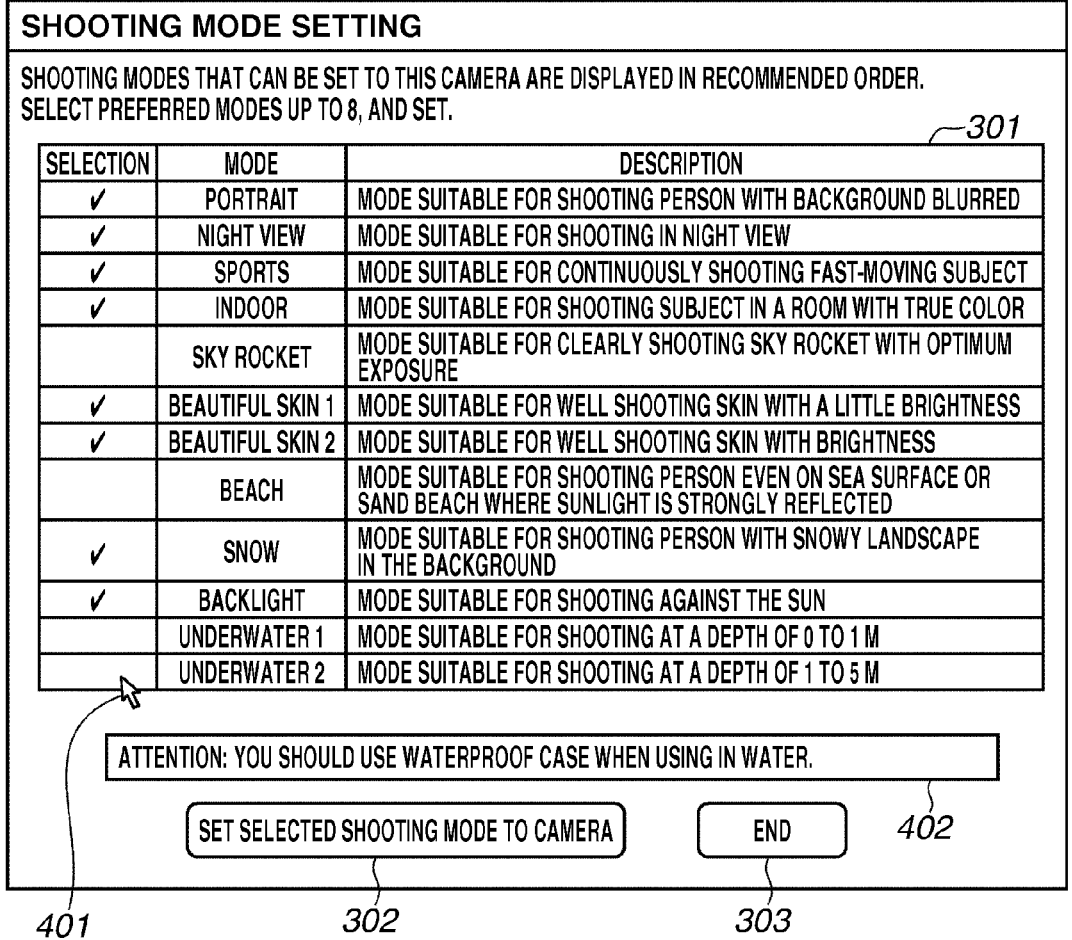

In the example in FIG. 2B, the imaging apparatus 100 connected to the PC 200 is a high-performance imaging apparatus for a function of high-speed continuous shooting. It is supposed, however, that this imaging apparatus does not have a waterproof function. In this case, like in FIG. 2A, the recommended shooting modes and their description are displayed on the list 301 in descending order, and a user can select the shooting mode, which the user intends to set to the imaging apparatus 100, with the check box.

However, since the attribute information of the imaging apparatus 100 is different from that in FIG. 2A, the order of the display is different. For example, the shooting modes in which blur processing or continuous shooting is performed is displayed above in the list, while the mode related to the underwater shooting is displayed below in the list.

FIG. 3A is an example of a table 4001 that indicates the recommended point of the shooting mode, which is different depending on the attribute of the camera as described above. The table 4001 is stored in the secondary storage device 205 in the PC 200. This table associates and holds the attribute of the camera determined based on the function of the camera and the shooting mode. Further, the shooting modes are displayed on the shooting mode setting screen in descending order of the recommended point.

The PC 200 acquires attribute information from the imaging apparatus 100, and displays the shooting modes in descending order of the recommended point by referring to the table 4001 illustrated in FIG. 3A. The recommended points may be displayed on the list 301 in FIGS. 2A and 2B to display to the user.

When a mouse cursor 401 indicates any one of the shooting modes on the list 301 in FIG. 2B, a note is displayed on an area 402 depending on the shooting mode. In the example in FIG. 2B, the imaging apparatus 100 having attribute information indicating a high-performance camera is connected, so that the recommended point for underwater 1 and underwater 2 is 1 in the table 4001 in FIG. 3A.

The condition in which the recommended point is 1 means that the mode can be set, but this mode is not recommended because it is not suitable for the imaging apparatus, or some conditions are required, and the note is displayed on the area 402.

For example, it is displayed that the imaging apparatus having the attribute information indicating the high-performance camera needs a waterproof case when the apparatus is used in water. The note is held in the secondary storage device 205 in the PC 200, and is referred to when the user puts the mouse cursor on the shooting mode having the recommended point 1, like the table 4002 in FIG. 3B.

In the present exemplary embodiment, the information is fixed for every recommended point, but the information may be different depending on the attribute information of the imaging apparatus and the recommended point.

In the table 4001 in FIG. 3A, the recommended point for the mode of underwater 3 for the high-performance camera is 0. The recommended point of 0 means that this shooting mode cannot be set. As a result, the mode of underwater 3 is not displayed on the list 301 in FIG. 2B.

Figure 4:
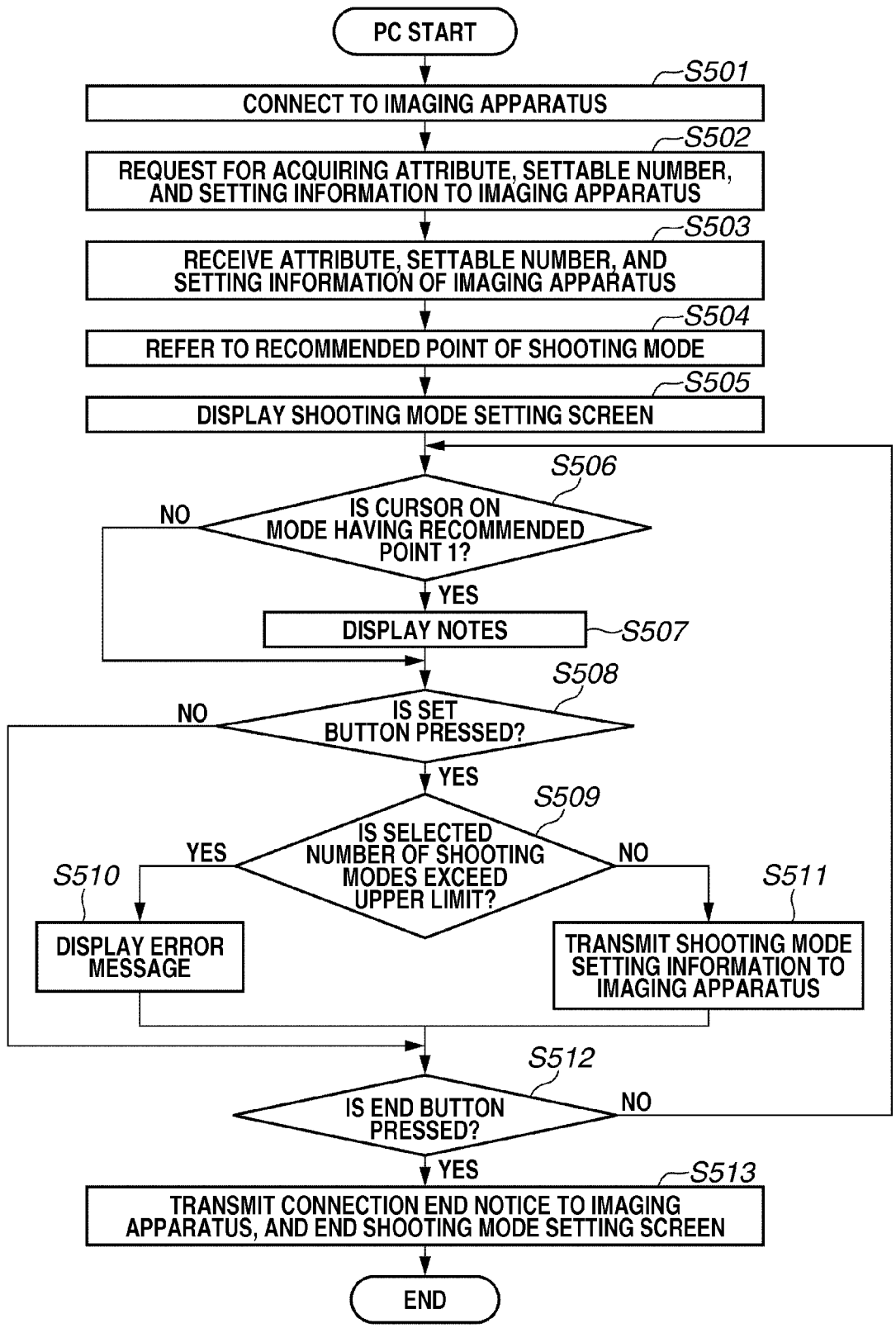
FIG. 4 is a flowchart illustrating an example of an operation of the PC.

Next, the procedure of the present exemplary embodiment will specifically be described with reference to flowcharts in FIGS. 4 and 5. FIG. 4 is a flowchart illustrating a flow of the process by the PC 200. The process described below is realized when the CPU 203 reads and executes the program recorded in the secondary storage device 205 in the PC 200.

As illustrated in FIG. 4, when the processing is started, the CPU 203 establishes a logical connection with the imaging apparatus 100 through the communication device 206 in step S501. Then, in step S502, the CPU 203 transmits to the imaging apparatus 100 a request to acquire attribute information indicating the characteristic of the imaging apparatus 100, a number of the settable shooting modes, and information of the shooting mode that has already been set.

The CPU 203 may receive the model name of the imaging apparatus 100 as the attribute information, and the PC 200 may find the function that the model has from the model name. Next, in step S503, the CPU 203 receives these pieces of information transmitted from the imaging apparatus 100 in response to the transmission of the acquisition request from the PC 200, and records these pieces of information in the secondary storage device 205.

Next, in step S504, the CPU 203 refers to the recommended point from the table 4001 in FIG. 3A stored in the secondary storage device 205 based on the attribute information of the imaging apparatus 100 obtained in step S503.

In step S505, the CPU 203 creates the shooting mode setting screen 300, as illustrated in FIGS. 2A and 2B, in which the shooting modes are listed in descending order of the recommended point except for the shooting modes having the recommended point of 0, and displays the screen on the display unit 201. In this case, the CPU 203 displays the shooting modes, which have already been set to the imaging apparatus 100 obtained at step S503, with the check mark added.

In step S506, the CPU 203 determines whether the mouse cursor is located on the shooting mode having the recommended point of 1 according to the user's operation by the operation unit 202. When the mouse cursor is located on the shooting mode (YES in step S506), the processing proceeds to step S507.

In step S507, the CPU 203 refers to the notes, as in the table 4002 in FIG. 3B stored in the secondary storage device 205, corresponding to the shooting mode, and displays the same on the display unit 201 as in FIG. 2B. When the mouse cursor is not located on the shooting mode as the result of the determination in step S506 (NO in step S506), the processing proceeds to step S508.

In step S508, the CPU 203 determines whether the setting button is pressed by the user's operation with the operation unit 202. If it is pressed (YES in step S508), the processing proceeds to step S509. If not (NO in step S508), the processing proceeds to step S512.

In step S509, the CPU 203 determines whether the number of the shooting modes having the check mark checked exceeds the upper limit number that can be set to the imaging apparatus 100 obtained in step S503. When it exceeds the upper limit (YES in step S509), the processing proceeds to step S510, wherein an error message such as "the number exceeds upper limit of settable shooting mode number", for example, is displayed on the display unit 201.

On the other hand, when the number does not exceed the upper limit (NO in step S509), the processing proceeds to step S511 where the CPU 203 transmits the shooting mode setting information to the imaging apparatus 100 through the communication device 206.

The shooting mode setting information is the combination of various control parameters, as described above, and further, is information of the function that can be executed, such as the name and the icon of the shooting mode displayed on the display unit 107 of the imaging apparatus 100. In step S511, the information of the function is transmitted.

In step S512, the CPU 203 determines whether the end button is pressed by the user's operation with the operation unit 202. When the end button is pressed as the result of the determination (YES in step S512), the processing proceeds to step S513. When it is not pressed (NO in step S512), the processing returns to step S506.

In step S513, the CPU 203 transmits a notice of ending the connection to the imaging apparatus 100 through the communication device 206, and then, ends the connection processing. The CPU 203 also ends the display of the shooting mode setting screen according to the present exemplary embodiment.

Next, the flow of the process by the imaging apparatus 100 will be described with reference to the flowchart in FIG. 5. The process described below is realized when the CPU 103 reads and executes the program recorded on the secondary storage device 105 of the imaging apparatus 100.

When the process is started, the CPU 103 establishes a logical connection with the PC 200 through the communication device 109 in step S601.

Then, in step S602, the CPU 103 determines whether a request to acquire attribute information indicating the characteristic of the imaging apparatus 100, a number of the settable shooting modes, and information of the shooting mode that has already been set is transmitted from the PC 200. This processing corresponds to that of step S502 executed by the PC 200 in FIG. 4.

When the acquisition request is transmitted from the PC 200 as the result of the determination (YES in step S602), the processing proceeds to step S603 where the CPU 103 of the imaging apparatus 100 transmits the pieces of the requested information to the PC 200 through the communication device 109. When the acquisition request is not transmitted (NO in step S602), the imaging apparatus 100 is in a stand-by state.

In step S604, the CPU 103 of the imaging apparatus 100 determines whether it receives the shooting mode setting information from the PC 200 through the communication device 109. This processing corresponds to the processing performed in step S511 executed by the PC 200 in FIG. 4, and the processing is performed to determine whether the shooting mode setting information is received.

When the CPU 103 of the imaging apparatus 100 receives the shooting mode setting information as the result of the determination (YES in step S604), it stores the shooting mode setting information on the secondary storage device 105 in step S605. Then, the CPU 103 sets the shooting mode so that the user can select the shooting mode by the operation unit 108 of the imaging apparatus 100. When the CPU 103 does not receive the shooting mode setting information (NO in step S604), the processing proceeds to step S606.

In step S606, the CPU 103 of the imaging apparatus 100 determines whether it receives a connection end notice from the PC 200 through the communication device 109. This processing corresponds to that in step S513 executed by the PC 200 in FIG. 4. When the CPU 103 does not receive the connection end notice as the result of the determination (NO in step S606), the processing returns to step S604. When the CPU 103 receives the connection end notice (YES in step S606), the CPU 103 of the imaging apparatus 100 ends the logical connection with the PC 200 in step S607.

As described above, according to the present exemplary embodiment, the recommended shooting modes are displayed in descending order, or a note is displayed, according to the connected imaging apparatus 100, whereby the apparatus 100 of the present invention provides the modes to a user so that the user can know whether the shooting mode is appropriate for the imaging apparatus 100. As a result, the user can easily set the shooting mode according to the user's purpose, and before the actual shooting, the user can easily select the one from the shooting modes, which are set beforehand, and can use the selected one.

In the above-mentioned first exemplary embodiment, a fixed shooting mode setting screen is displayed on the display unit 201 of the PC 200 according to the attribute of the imaging apparatus 100, regardless of the condition of the connected imaging apparatus 100.

The present exemplary embodiment is a system in which a selected shooting mode setting is changed by the operation unit 108 of the imaging apparatus 100 to change the recommended shooting mode displayed on the display unit 201 of the PC 200, whereby the shooting mode selected by the user is set to the imaging apparatus 100. The present exemplary embodiment will be described with reference to FIGS. 6A to 7B.

Figure 6A:
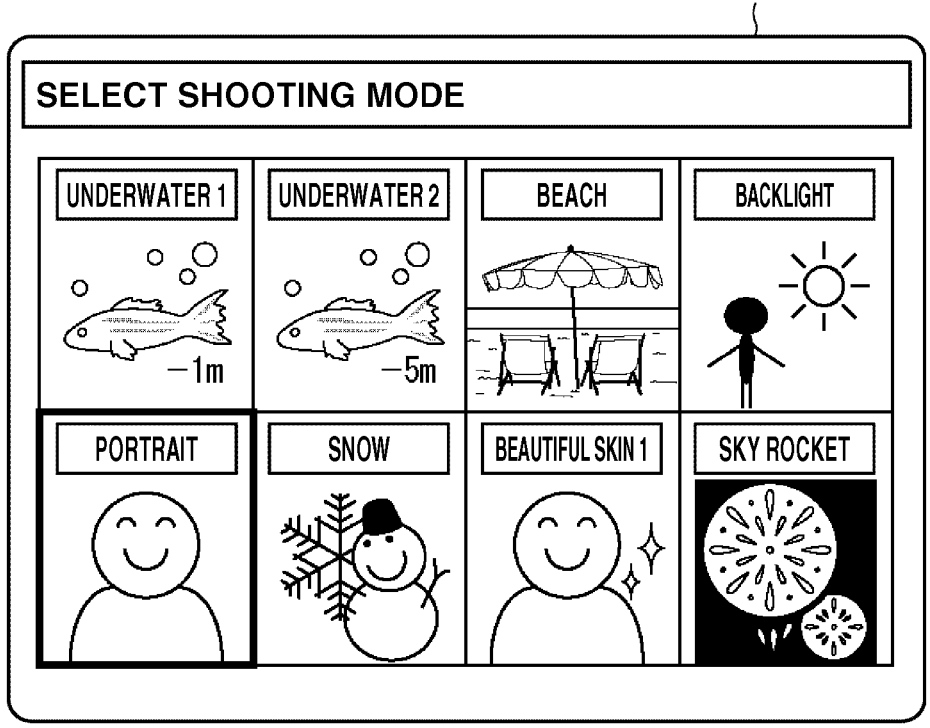
FIGS. 6A and 6B respectively illustrate an example of the display screen on the imaging apparatus.

FIG. 6A illustrates an example of a screen 700 for selecting a shooting mode on the display unit 107 of the imaging apparatus 100. The imaging apparatus 100 according to the present exemplary embodiment can have the shooting modes up to 8 as illustrated in the mode selection screen 700. In FIG. 6A, the shooting mode of a portrait is selected, and the selection of the shooting mode can be changed by the operation unit 108.

FIG. 7A illustrates an example of a shooting mode setting screen 800 displayed on the PC 200 according to the present exemplary embodiment. When the imaging apparatus 100 and the PC 200 are connected with the state in FIG. 6A, the present screen is displayed on the display unit 201 of the PC 200.

In the shooting mode setting screen 800 in FIG. 7A, the shooting mode that is currently selected on the imaging apparatus 100 is displayed in an area 801. The shooting modes related to the shooting mode, which is currently selected on the imaging apparatus 100, and their description are displayed on a list 802. The shooting modes that have already been set to the camera and their description are displayed on a list 803. Like the first exemplary embodiment, the user can select the shooting mode, which the user intends to set to the imaging apparatus 100, with a check box on both of the lists 802 and 803.

Setting buttons 302 and 303 have the same function as those described in FIG. 2A of the first exemplary embodiment, so that the description will not be repeated. Like FIG. 2B in the first exemplary embodiment, a note for the shooting mode may be displayed depending on the position of the mouse cursor even in FIG. 7A.

FIG. 8 illustrates an example of a table 900 indicating shooting modes that are related to each other. The table 900 is recorded on the secondary storage device 205 of the PC 200. The shooting mode displayed on the list 802 in FIG. 7A is displayed with reference to the table 900 in FIG. 8.

The information is fixed for every shooting mode in the table 900 in FIG. 8 as an example, but the information may be different depending on the attribute information of the imaging apparatus. In this case, if the imaging apparatus is the one that cannot take a photograph under water, the modes of underwater 1 to underwater 3 may be deleted from the table 900. As a result, these modes are not displayed on the list 803 in FIG. 7A, so that there is no possibility of these shooting modes being set to the imaging apparatus.

Figure 7B:
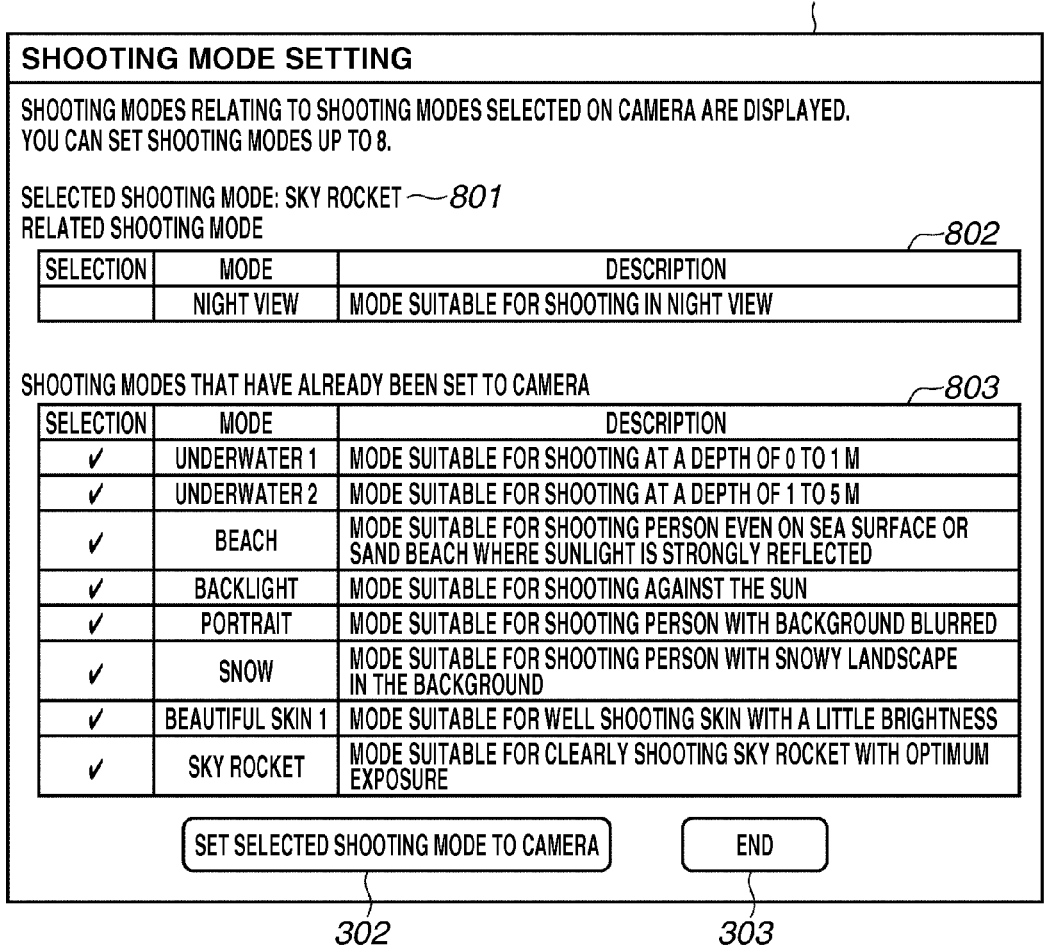

FIG. 7B illustrates an example of the shooting mode setting screen 800 displayed on the display unit 201 of the PC 200, after the shooting mode selected on the imaging apparatus 100 is changed to the sky rocket mode from the portrait mode.

The mode on the area 801 is changed to the sky rocket mode, and the shooting modes displayed on the list 802 are changed to the night view mode that is related to the skyrocket mode. In this way, when the shooting mode selected on the imaging apparatus 100 is changed, the shooting modes on the list 802 displayed on the shooting mode setting screen of the PC 200 is also changed in the present exemplary embodiment.

Figure 6B:
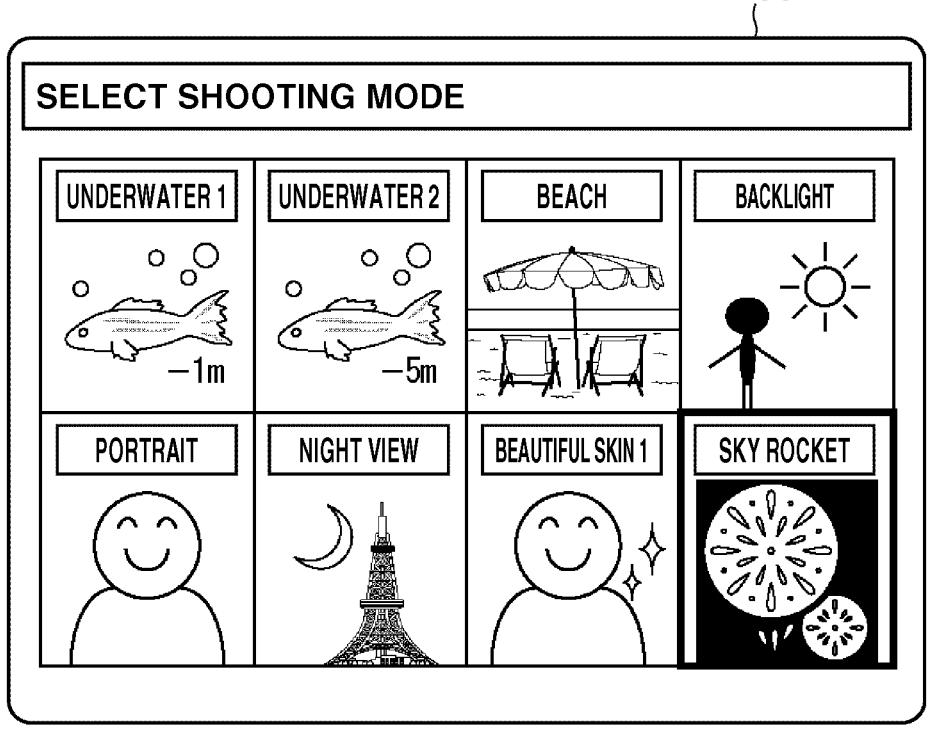

FIG. 6B illustrates an example of a mode selection screen 1100. The mode selection screen 1100 in FIG. 6B is an example of the screen on the display unit 107 of the imaging apparatus 100, when the check mark of the snow mode is canceled from the state illustrated in FIG. 7B, and the setting button 302 is pressed with the check mark of the night view mode checked to set the shooting mode. As illustrated in FIG. 6B, the night view mode is set, instead of the snow mode, on the imaging apparatus 100.

The list 803 in FIG. 7B is also updated so that the modes that have already been set to the camera are changed to the latest ones on the screen on the PC 200. Although it is not illustrated, the night view mode is set, in this case, instead of the snow mode on the screen.

Figure 9:
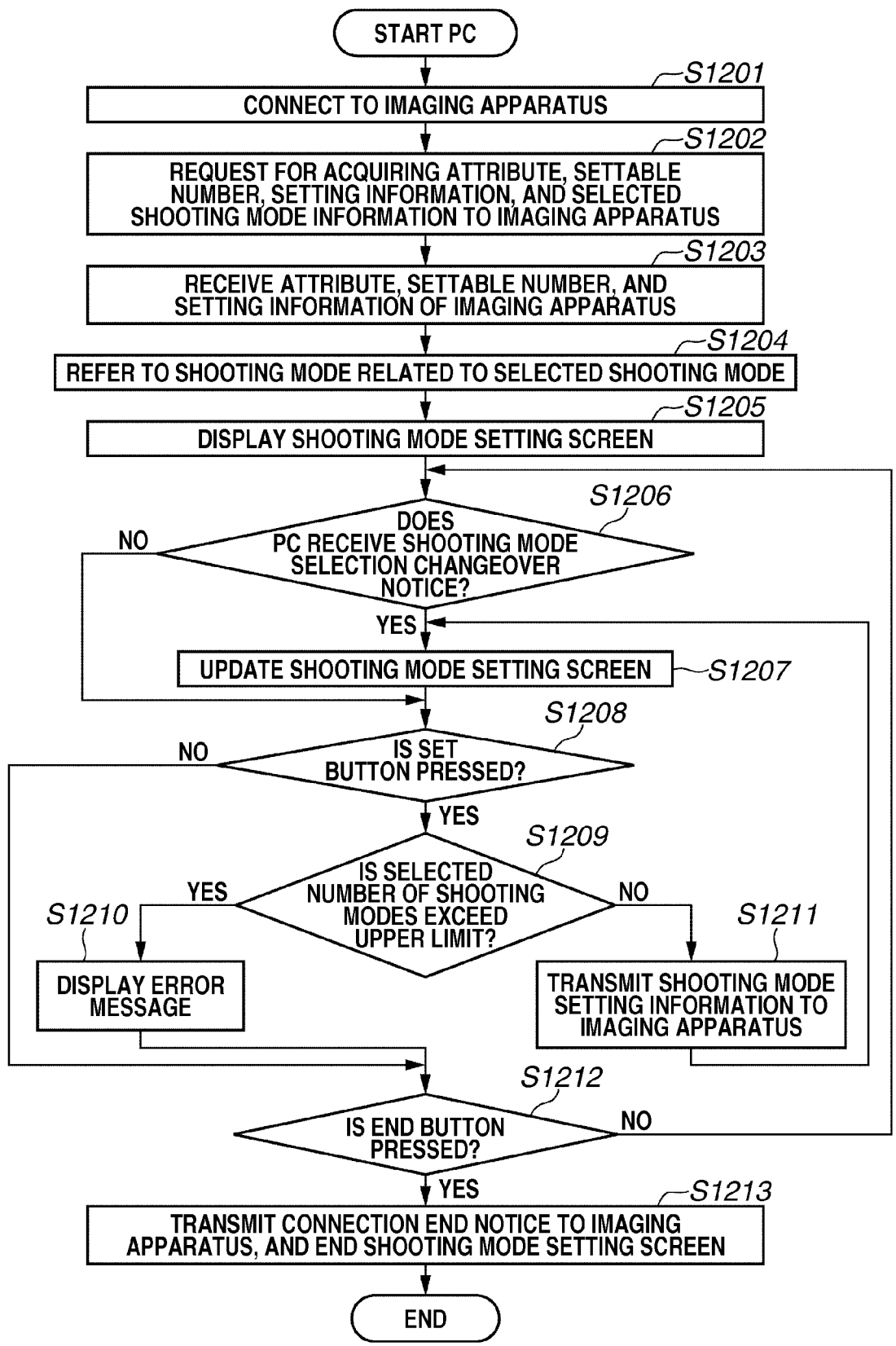
FIG. 9 is a flowchart illustrating an example of an operation of the PC.

Next, the processing of the present exemplary embodiment will specifically be described with reference to the flowcharts in FIGS. 9 and 10. FIG. 9 is a flowchart illustrating a flow of the process by the PC 200. The processing described below is realized when the CPU 203 reads and executes the program recorded on the secondary storage device 205 in the PC 200.

When the process is started, the CPU 203 establishes a logical connection with the imaging apparatus 100 through the communication device 206 in step S1201. Then, in step S1202, the CPU 203 transmits to the imaging apparatus 100 a request to acquire attribute information indicating the characteristic of the imaging apparatus 100, a number of the settable shooting modes, information of the shooting mode that has already been set, and setting information of the shooting mode that is currently selected. In step S1203, the CPU 203 receives these pieces of information, which are transmitted by the imaging apparatus according to the request of acquisition, and records the same in the secondary storage device 205.

Next, in step S1204, the CPU 203 refers to the related shooting mode from the table 900 in FIG. 8 stored in the secondary storage device 205 based on the attribute information of the imaging apparatus 100 and the setting information of the shooting mode that is currently selected at the imaging apparatus 100 obtained in step S1203.

In step S1205, the CPU 203 creates the shooting mode setting screen that displays the setting information of the shooting mode that is currently selected at the imaging apparatus 100, the setting information of the shooting mode related to the shooting mode, and the setting information of the shooting mode that has already been set to the imaging apparatus 100, and displays thereof on the display unit 201. In this case, the screen is displayed in such a manner that the shooting modes, which have already been set to the imaging apparatus 100 obtained in step S1203, are displayed with the check mark checked.

In step S1206, the CPU 203 determines whether the imaging apparatus 100 transmits a shooting mode selection changeover notice (described below) through the communication device 206. When the imaging apparatus 100 transmits the notice (YES in step S1206), the processing proceeds to step S1207 where the CPU 203 updates the shooting mode setting screen on the display unit 201. Specifically, the CPU 203 updates the setting information part of the shooting mode that is currently selected at the imaging apparatus 100 and the display part of the setting information of the shooting mode related to the shooting mode, such as the area 801 and the list 802 in FIG. 7A.

Even after the CPU 203 transmits the shooting mode setting information to the imaging apparatus in step S1211, the processing returns to step S1207. In this case, the CPU 203 updates the setting information part of the shooting mode that has already been set to the imaging apparatus 100, such as the list 803 in FIG. 7A. The processes executed in steps S1208 to S1213 are the same as those in the first exemplary embodiment, so that the description will not be repeated.

On the other hand, the flow of the process by the imaging apparatus 100 will be described with reference to the flowchart in FIG. 10. The process described below is realized when the CPU 103 reads and executes the program recorded on the secondary storage device 105 of the imaging apparatus 100. When the process is started, the CPU 103 establishes a logical connection with the PC 200 through the communication device 109 in step S1301.

Then, in step S1302, the CPU 103 determines whether a request to acquire attribute information indicating the characteristic of the imaging apparatus 100, a number of the settable shooting modes, setting information of the shooting mode that has already been set, and information of the shooting mode that is currently selected is transmitted from the PC 200. This corresponds to step S1202 executed by the PC 200 in FIG. 9.

When the acquisition request is transmitted from the PC 200 as the result of the determination (YES in step S1302), the processing proceeds to step S1303 where the CPU 103 of the imaging apparatus 100 transmits the pieces of the requested information to the PC 200 through the communication device 109. When the acquisition request is not transmitted (NO in step S1302), the imaging apparatus 100 is in a stand-by state.

Next, in step S1304, the CPU 103 determines whether the shooting mode, which is currently selected, is changed by the operation unit 108 on the imaging apparatus 100. When it is changed (YES in step S1304), the processing proceeds to step S1305 where the CPU 103 transmits a shooting mode selection changeover notice to the PC 200 through the communication device 109.

In this case, the information of the shooting mode that is currently selected after the changeover is also transmitted. This processing corresponds to the processing in step S1206 in FIG. 9. The processes executed in steps S1306 to S1309 are the same as those in the first exemplary embodiment, so that the description will not be repeated.

As described above, according to the present exemplary embodiment, the related shooting mode is provided from the shooting modes that have already been set to the imaging apparatus 100 by the user. Therefore, the possibility of preferentially displaying the shooting mode that the user desires can be increased.

When the first exemplary embodiment and the second exemplary embodiment are combined, the user can more easily set the shooting mode according to the user's purpose of use. The user can easily set the recommended shooting mode according to the attribute of the imaging apparatus 100 on the screen according to the first exemplary embodiment, while on the screen according to the second exemplary embodiment, the user can easily set the shooting mode related to the shooting mode that the user selects on the imaging apparatus.

As the method for combining the exemplary embodiments, for example, when the imaging apparatus 100 is connected to the PC 200 in the state in which the imaging apparatus 100 displays other than the shooting mode selection screen (e.g., the reproduced image that was captured), the screen in the first exemplary embodiment is displayed. When the imaging apparatus 100 is connected to the PC 200 in the state in which the imaging apparatus 100 displays the shooting mode selection screen, the screen in the second exemplary embodiment is displayed.

The present invention is also realized by executing the process described below. Specifically, software (program) that realizes the function of the above-mentioned exemplary embodiments is supplied to a system or an apparatus through a network or various storage media, and a computer (or CPU or microprocessing unit (MPU)) of the system or the apparatus reads and executes the program.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-173607 filed Jul. 24, 2009, which is hereby incorporated by reference herein in its entirety.

What is claimed is:

1. An imaging system in which an imaging apparatus and an information processing apparatus can communicate with each other, the information processing apparatus including:
   a receiving unit configured to receive attribute information related to the imaging apparatus from the imaging apparatus;
   a providing unit configured to provide a list including a plurality of shooting modes, each corresponding to the attribute information, to the imaging apparatus; and
   a transmission unit configured to transmit, from the list, setting information including a shooting parameter of a shooting mode that is designated by the imaging apparatus, to the imaging apparatus, wherein the information processing apparatus comprises a processor for executing a program stored in a memory to implement at least a part of a function of at least one of the above units, the imaging apparatus including:

a selection unit configured to select one of the shooting modes corresponding to the setting information transmitted from the information processing apparatus, and an imaging unit configured to execute image processing by using the setting information of the selected shooting mode, wherein the imaging apparatus comprises a processor for executing a program stored in a memory to implement at least a part of a function of at least one of the above units, wherein when the imaging apparatus displays a shooting mode selection screen, the receiving unit receives a type of the shooting mode, which is currently selected at the imaging apparatus, from the imaging apparatus as the attribute information, and the providing unit provides the list including the shooting mode related to the currently selected shooting mode to the imaging apparatus, and when the imaging apparatus displays other than the shooting mode selection screen, the receiving unit receives a name of a model of the imaging apparatus as the attribute information, and the providing unit provides a list including the shooting mode corresponding to the name of the model to the imaging apparatus.

2. An information processing apparatus capable of communicating with an imaging apparatus, comprising:

a receiving unit configured to receive attribute information related to the imaging apparatus from the imaging apparatus;

a providing unit configured to provide a list including a plurality of shooting modes, each corresponding to the attribute information, to the imaging apparatus; and a transmission unit configured to transmit, from the list, setting information including a shooting parameter of a shooting mode that is designated by the imaging apparatus, to the imaging apparatus, wherein the information processing apparatus comprises a processor for executing a program stored in a memory to implement at least a part of a function of at least one of the above units, wherein when the imaging apparatus displays a shooting mode selection screen, the receiving unit receives a type of the shooting mode, which is currently selected at the imaging apparatus, from the imaging apparatus as the attribute information, and the providing unit provides the list including the shooting mode related to the currently selected shooting mode to the imaging apparatus, and when the imaging apparatus displays other than the shooting mode selection screen, the receiving unit receives a name of a model of the imaging apparatus as the attribute information, and the providing unit provides a list including the shooting mode corresponding to the name of the model to the imaging apparatus.

3. The information processing apparatus according to claim 2, wherein the receiving unit receives a type of the shooting mode, which has already been set to the imaging apparatus, from the imaging apparatus as the attribute information, and the providing unit provides the list, by which the shooting mode, which has already been set, can be identified from the other shooting modes, to the imaging apparatus.

4. The information processing apparatus according to claim 2, further including a display unit, and wherein the receiving unit receives from the imaging apparatus an upper limit number of the shooting mode that can be set to the imaging apparatus as the attribute information, and the display unit displays an error message when the number of the shooting modes designated by the imaging apparatus exceeds the upper limit number.

5. A control method of an information processing apparatus that can communicate with an imaging apparatus, comprising:

receiving attribute information related to the imaging apparatus from the imaging apparatus;

providing a list including a plurality of shooting modes, each corresponding to the attribute information, to the imaging apparatus; and transmitting, from the list, setting information including a shooting parameter of a shooting mode that is designated by the imaging apparatus to the imaging apparatus, wherein when the imaging apparatus displays a shooting mode selection screen, receives a type of the shooting mode, which is currently selected at the imaging apparatus, from the imaging apparatus as the attribute information, and provides the list including the shooting mode related to the currently selected shooting mode to the imaging apparatus, and when the imaging apparatus displays other than the shooting mode selection screen, receives a name of a model of the imaging apparatus as the attribute information, and provides a list including the shooting mode corresponding to the name of the model to the imaging apparatus.

6. A non-transitory computer-readable storage medium that stores a program for realizing an information processing apparatus that can communicate with an imaging apparatus, the program comprising:

receiving attribute information related to the imaging apparatus from the imaging apparatus;

providing a list including a plurality of shooting modes, each corresponding to the attribute information, to the imaging apparatus; and transmitting, from the list, setting information including a shooting parameter of a shooting mode that is designated by the imaging apparatus to the imaging apparatus, wherein when the imaging apparatus displays a shooting mode selection screen, receives a type of the shooting mode, which is currently selected at the imaging apparatus, from the imaging apparatus as the attribute information, and provides the list including the shooting mode related to the currently selected shooting mode to the imaging apparatus, and when the imaging apparatus displays other than the shooting mode selection screen, receives a name of a model of the imaging apparatus as the attribute information, and provides a list including the shooting mode corresponding to the name of the model to the imaging apparatus.

* * * * *